March 4, 1952 K. K. PROBST 2,588,161
TRANSMISSION MECHANISM
Filed March 27, 1947
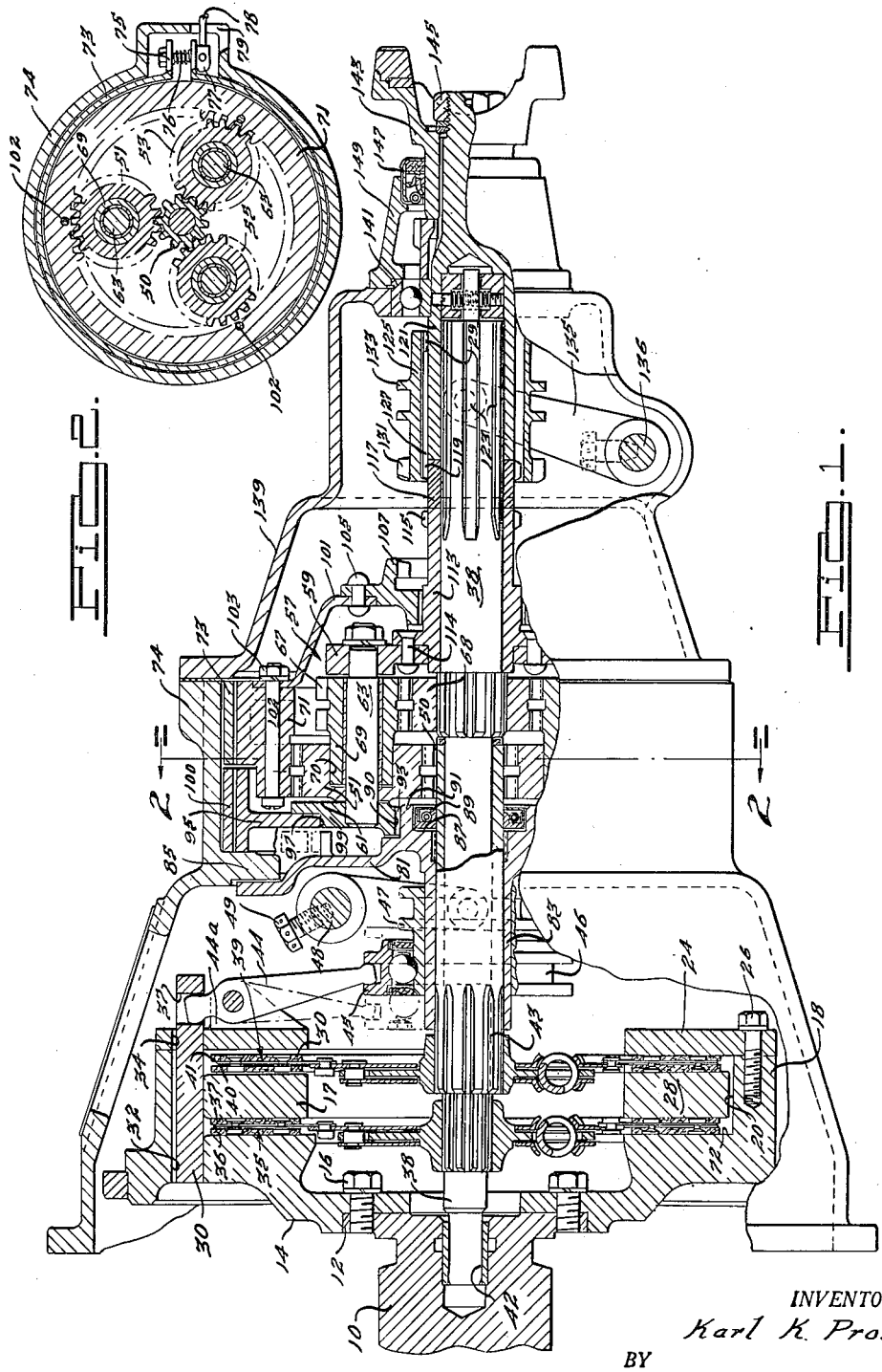
INVENTOR.
Karl K. Probst.
BY
Harness Dickey & Pierce.
ATTORNEYS.

Patented Mar. 4, 1952

2,588,161

UNITED STATES PATENT OFFICE 2,588,161

TRANSMISSION MECHANISM

Karl K. Probst, Lansing, Mich.

Application March 27, 1947, Serial No. 737,487

12 Claims. (Cl. 74—765)

This invention relates to variable speed transmissions for motor vehicles and more particularly to such transmissions employing a planetary gear system.

It is an object of this invention to provide an improved type variable speed transmission which has relatively few gears for the variable speeds it produces in comparison with those presently employed.

It is a further object of this invention to provide a variable speed transmission capable of providing four forward speeds and one reverse speed and which employs a planetary gear system of relatively few gears to produce this result.

It is a further object of this invention to provide a variable speed transmission of relatively small size which will be efficient in operation and simple to construct.

These and other objects of my invention will become apparent from the following detailed description taken in conjunction with the accompanying drawings, in which:

Figure 1 is a cross-sectional view of the transmission of this invention;

Fig. 2 is a cross-sectional view of the planetary system of transmission taken along the line 2—2 of Fig. 1.

Referring to the drawing, the rear end of an engine crankshaft is illustrated at 10 and as being provided with the usual mounting flange 12 upon which a flywheel 14 is mounted in concentric relation with respect thereto and secured thereto by means of screws 16. The flywheel 14 is of the conventional type provided with a rearwardly projecting rim 18 providing a concentric cylindrical recess or pocket 20 therein bounded at its forward or left-hand end by a wall 22 perpendicular to the axis of rotation of the crankshaft 10. A radially inwardly projecting abutment plate or ring 24 is secured to the rear face of the flywheel rim 18 in concentric relation with respect thereto by means of screws 26, the forward or left-hand face of the abutment ring 24 being perpendicular to the axis of the crankshaft 10 and therefore parallel with the face 22 of the flywheel 14.

Received in the pocket 20 in concentric relation with respect thereto is a pressure plate or annular ring 28 which will be observed to be of less thickness than the axial depth of the pocket 20. This pressure plate or ring 28 is mounted at its periphery by a plurality of preferably equally angularly spaced bars 30 suitably fixed thereto in parallel relation with respect to the axis of the crankshaft 10. Each bar 30 is axially slidably received in an opening 32 in the flywheel 14 and an aligned opening 34 in the plate 24, the opening 32 in the flywheel being extended into the rim 18 thereof as a radially inwardly opening groove in the recess 20 which exposes the radially inner face of the bar 30 therein for anchorage to the pressure plate 28.

Positioned between the pressure plate 28 and the wall 22 of the flywheel 14 is a conventional friction clutch plate 35 having oppositely disposed friction faces 36 and 37. The clutch plate 35 is splined to a shaft 38 concentric with the axis of the crankshaft 10 and journaled at its forward end in a bearing 42 mounted in a central aperture in the rear end of the crankshaft. A second clutch plate 39 having opposed friction faces 40 and 41 is positioned between the pressure plate 28 and the abutment ring 24 secured to the rear face of the flywheel and is splined to a shaft 43 which is coaxial with and rotatably surrounds the shaft 38. Shaft 43 is adapted to rotate independently of shaft 38 when driven by clutch plate 39. Upon movement of the bars 30 forwardly or rearwardly the pressure plate 28 is moved forwardly or rearwardly so as to clamp one of the clutch plates between it and the flywheel, depending on which way it is shifted.

The bars 30 are conventionally operated by shifting arms 44, pivotally supported by ears 44a which are fixedly connected to the plate 24 so that the arms 44 will rotate with the plate 24, and the arms are connected in radially directed openings 37 in each of the bars. The opposite end of shifting arms 44 is connected in a yoke 45 of a hub unit or clutch control collar 46, corresponding somewhat to a conventional clutch throw-out collar. This unit 46 is adapted to be shifted forwardly and rearwardly by an arm 47 which is secured to a clutch shifter shaft 48 by means of a set screw 49. The shaft 48 is adapted to be operated in a suitable or conventional manner so that the bars 30 may be moved forwardly or rearwardly to engage the pressure plate 28 with either of the clutch plates 35 and 39.

Rearwardly of the flywheel 14 a planetary gear system is provided for furnishing the various output speeds for the transmission. The system comprises a sun gear 50 which is fixedly mounted upon the shaft 43 and which meshes with three equally angularly spaced planetary gears 51, 53 and 55. These gears may be of any suitable type, but are preferably of the staggered tooth herringbone type to prevent any end thrust from being set-up from torque being transmitted through the gears. These gears are carried by a carrier 57 which comprises two oppositely disposed end walls 59 and 61 between which three pins 63, one for rotatably supporting each gear extend, with one end of each pin mounted in end wall 61 and the other end shouldered and passing through and secured to the end wall 59 by means of a nut 65 threaded on one end of pin 63 to hold it firmly in place. A staggered tooth herringbone gear 67 is also rotatably mounted on each pin 63 and each planetary gear has a recess 70 in one end thereof in which a projecting cylindrical shank portion 69 of each gear 67 is received. Suitable means are provided for rigidly connecting each of the gears 67 to its respective planetary gear. The gears 67 mesh with a complementary gear 68 which is splined to the shaft 38 to provide a driving connection therebetween.

The planetary gears 51, 53 and 55 mesh with gear teeth on the inner periphery of a ring gear 71. An annular brake band 73 is positioned between the outer periphery of the ring gear 71 and the housing 74 for the clutch and transmission which surrounds the ring gear. It will be understood that this housing is of a more-or-less conventional type having a flanged forward end adapted to be secured to the rear end of the associated engine block so as to be supported thereby. The band 73 may be tightened to prevent rotation of the ring gear by any suitable means. In the drawings, as best shown in Fig. 2, the band 73 is illustrated as split and having its ends 75 bent outwardly. These end portions 75 have aligned apertures therethrough, through which a threaded bolt 76 passes. The head of the bolt 76 abuts the surface of one end portion and a cam element 77 is threaded onto the lower end of the bolt which projects through the other brake end portion 75. The cam element 77 is actuated by a lever 78 which passes through an elongated aperture 79 in the transmission housing, and when the lever is moved downwardly it causes the band 73 to tighten around the ring gear and prevent its rotation. Any suitable conventional means may be provided for actuating the lever 78.

Positioned between the portion of the housing 74, which houses the planetary gear system, and the portion which houses the flywheel and clutch plates, is an annular wall or flange 81, the inner periphery of which terminates in a forwardly extending sleeve portion 83 coaxial with the shaft 43 and forms a bearing therefor. The clutch control collar 46, previously described, is slidably mounted on the exterior of the stationary sleeve portion 83 and is movable either forwardly or rearwardly thereon.

The outer portion of the flange 81 is sealingly secured to the front face of an inwardly extending radial housing flange 85, by any suitable means. The inner periphery of the flange 81, rearwardly of the sleeve portion 83, is recessed as at 87 to receive a conventional oil seal 89 therein which prevents lubricating oil for the planetary gear system from entering the forward portion of the transmission and clutch housing 74.

The inner periphery 90 of the end wall 61 of the carrier 57 is supported on a hub 91 of the flange 81, and needle or other suitable bearings 93 are disposed between the hub and end wall inner periphery to allow rotation therebetween.

A ring or drum element or member 95, having a central aperture 97 therein is mounted on a cylindrical hub 99 formed on the outer end of the end wall 61, and the drum element is rigidly secured to the end wall by any suitable means, such as bolts, rivets, or the like. The drum member 95 is concentric with and has its outer periphery disposed adjacent to the adjacent inner wall of the housing 74. A second brake band 100 is positioned between the housing 74 and the outer periphery of the drum member 95, and is similarly adapted, as is the brake band 73, to be tightened to prevent the rotation of drum member 95 and thus of the entire carrier 57. The ring gear 71 has a spider 101 secured to its rear face by means of bolts 102 and nuts 103. Surrounding the shaft 38 and secured to the rear face of the spider 101, by means of rivets 105, is a conventional clutch jaw 107 of the dog type.

Rearwardly of the splined connection between the gear 68 and the shaft 38, a coaxial sleeve 113 rotatably surrounds the shaft 38. This sleeve 113 is secured to the end plate 59 of the carrier 57 by means of rivets 114 thereby supporting the rear end of the carrier 57 on the shaft 38. The sleeve 113, being rotatably mounted on the shaft 38, turns only when the end plate 59 of the carrier drives it. An outwardly facing clutch jaw 115 of the dog type is formed on the rear end of sleeve 113 and adapted for use as will be hereinafter described. Positioned adjacent the rear of the sleeve 113 is a second sleeve 117 which is splined to the shaft 38. This sleeve 117 is likewise provided with an outwardly facing radial clutch jaw 119 of the dog type. A third sleeve 121 is rotatably mounted on shaft 38 and has its front end abutting the rear of sleeve 117. The outer periphery of this sleeve 121 is formed with longitudinal splines 123 thereon. Coaxial with the sleeves and slidably mounted thereon is a shiftable clutch control collar. Two sets of radially inwardly facing dog type clutch jaws 127 and 129 are provided on the inner periphery of the clutch collar 125 and are spaced at opposite ends thereof. On the outer periphery of the clutch collar 125, at the forward end thereof, is a third dog type clutch jaw 131 which faces outwardly and is adapted to engage the jaw 107 on the spider 101 when the clutch collar 125 is so shifted. Jaw 129 on collar 125 engages the splined portion 123 on sleeve 121 at all times. The jaw 127 is adapted to engage either the jaw 119 on the sleeve 117 or the jaw 115 on sleeve 113, depending on the position of the clutch collar 125.

The clutch collar 125 is provided with a yoke 133 on the outer periphery thereof into which a shifting arm 135 is fitted. This shifting arm 135 is secured to the clutch shifter 136 and shifts the clutch collar 125 in the same way that the arm 47 shifted the clutch control collar 46, as previously described.

The clutch and transmission housing is divided into two parts, so that it may be easily disassembled for repair purposes. The forward housing portion 74 terminates adjacent the rear of the planetary gear system and a second housing portion 139 is sealingly secured thereto by any suitabl means. Rearwardly of clutch collar 125 the shaft 38 terminates at the rear of the transmission housing portion 139. The end of the shaft is supported by the sleeve 121 which extends through the rear of the housing where it is rotatably supported in a bearing 141 mounted in the housing. The sleeve 121 is connected to a stub shaft 143 by means of a nut 145 screwed on the end of the sleeve. The stub shaft 143 is rotatably supported in a universal joint 147 mounted in a hub member 149 attached to the rear of the transmission housing portion 139.

In operation, the transmission illustrated in the drawing will produce four forward speeds and one reverse speed. The forward speeds illustrated in the drawing comprise an emergency low speed, a second speed, a third speed, and a high speed, or direct drive, but it will readily be seen that the transmission could be constructed so as to employ only certain of these forward speeds or any combination thereof.

When it is desired to drive the vehicle at the emergency low speed, the clutch plate 39 is clamped between the abutment ring 24 of the flywheel 14 and the pressure plate 28 by shifting the pressure plate rearwardly as previously described. The shaft 43 is then rotated, due to its connection with the engine flywheel 14, which in turn drives the sun gear 50 which is fixedly mounted on the shaft 43. At this time the brake band 73 is tightened so as to prevent the ring gear 71 from rotating, thereby causing the planetary gears 51, 53, and 55 and the entire carrier 57 to planetate about the shaft 43. This causes rotation of the gears 67 mounted on the pivot pins 63 of the carrier 57 which in turn mesh with the complementary gear 68 which is splined to the shaft 38. The clutch collar 125 in the meantime has been shifted forward so that clutch jaw 127 is meshed with the jaw 115 on the sleeve 113 which is connected to the carrier by rivets 114. The other jaw 129 is still in engagement with the splines of sleeve 121 and therefore drives the sleeve 121 at the same rate that the sleeve 113 is being driven. The sleeve 121 in turn being connected to the final drive mechanism, i. e., stub shaft 143 and associated structure drives that mechanism at the same speed. In the emergency low speed drive, illustrated in the drawing, and with gears proportioned as shown, there is a reduction of speed between the engine and the transmission final drive mechanism of approximately 5.4.

When the second forward speed is desired, the clutch plate 39 is again engaged with the flywheel 14. The brake band 100 is tightened around the ring or drum member 95 to prevent it from rotating and the clutch collar 125 is shifted so that its clutch jaw 127 is engaged with the jaw 119 of the sleeve 117 and its other jaw 129 is engaged with the splined portion 123 of the sleeve 121. Once again the clutch plate 39 causes the shaft 43 to rotate and therefore causes the sun gear 50 to drive the planetary gears 51, 53 and 55. As the brake band 100 has been tightened about the ring or drum member 95 the carrier 57 cannot rotate. This forces the planetary gears to rotate about their own axis and cause the gears 67, mounted on the pins 63 of the carrier 57, to rotate and drive the complementary gear 68 on the splined shaft 38. This causes the sleeve 117, which is splined to the shaft 38, to rotate at the same speed. Sleeve 121 being connected through the clutch collar 125 to the sleeve 117 is likewise rotated and drives the final drive mechanism at that speed, which in the embodiment herein illustrated, and with gears proportioned as shown, is reduced approximately 2.5 times that of engine speed.

In order to obtain the third forward speed, the clutch plate 39 is again engaged with the flywheel 14 and the brake band 73 is clamped tightly around the ring gear 71, preventing its rotation. The clutch collar 125 is in the same position as for second speed. As the brake band 73 prevents the ring gear 71 from rotating, once more the planetary gears and the carrier are caused to planetate about the shaft 43 and the gears 67 which are meshed with the complementary gear 68 rotate the shaft 38. The rotation of the shaft 38 causes the sleeve 117, which is splined thereto to rotate and the sleeve 121 is driven, as described for second speed, and drives the final drive mechanism at a speed reduction of approximately 1.97 times that of the engine speed with gears proportioned as shown.

When high speed or direct drive is desired, the pressure plate 28 is moved forwardly to clamp the clutch plate 35 between it and the end wall 22 of the flywheel 14. The clutch plate 35 then drives the shaft 38 which in turn drives straight through the transmission without operating the planetary gear system. The clutch collar 125, which is positioned the same as it was for the second and third speeds, drives the final speed mechanism, as described, at the same speed as that of the engine.

When it is desired to reverse the direction of rotation of the final speed mechanism, the clutch plate 39 is once more engaged with the flywheel 14. The brake band 100 is tightened around the ring or drum member 95 to prevent rotation of the carrier, and the clutch collar 125 is shifted forwardly so that the clutch jaw 127 engages with the jaw 107 on the spider 101. Clutch jaw 129 is still in contact with the splines on the sleeve 121 so as to drive the final speed mechanism. The shaft 43 drives the sun gear 50 which in turn causes the planetary gears to rotate about their own axes. This rotation is still in the same direction as that of the shaft 43. The planetary gears then cause the ring gear 71 to rotate in the opposite direction from that of the shaft 43. The spider 101 which is connected to the ring gear 71, through the bolts 102, then is rotated in the same direction as the ring gear 71. As the clutch collar 125 has its jaw 127 in engagement with the jaw 107 of the spider, the spider causes the sleeve 121, and thus the final drive mechanism, to rotate but in an opposite direction from that of the shaft 43 thereby reversing the direction of rotation of the transmission final drive mechanism from that of the engine. The speed ratio between the engine and final drive mechanism of this reverse drive is equal to that of the emergency low forward speed of the engine.

It is always possible by removing certain of the clutch jaws on either the clutch collar 125 or on its complementary engaging members to eliminate any of the speeds of the transmission without affecting the remainder of the drive speeds. For example, by eliminating the clutch jaw 115 on sleeve 113, it will readily be seen that the emergency low forward speed of the transmission will be eliminated but will leave the remainder of the forward speeds and the reverse speed unaffected. Likewise, if the clutch jaw 119 on the sleeve 117 were removed, the second forward speed of the transmission would be eliminated without affecting the remainder of the speeds. Thus, it will readily appear that the transmission may be constructed with any combination of the speeds shown in the embodiment of the drawings.

While I have described one particular embodiment of my invention, it is to be understood that I do not wish to be restricted thereto, and that I intend to cover all modifications thereof which would be apparent to one skilled in the art and which come within the spirit and scope of the appended claims.

I claim:
1. A variable speed transmission comprising a driving member, a pair of coaxial driven shafts, clutch plates mounted on each of said shafts engageable with said driving member, a final drive mechanism mounted on a first of said driven shafts a planetary gear system comprising a sun gear mounted on the second of said driven shafts, planetary gears driven by said sun gear and a ring gear driven by said planetary gears, a carrier having said planetary gears rotatably mounted thereon and a second gear coaxial with and connected to each of said planetary gears, means operable to hold said carrier against rotation to cause said gears to rotate about their own axes, means operable to hold said ring gear against rotation to cause rotation of said carrier and planetation of the gears about the axis of said driven shafts, a gear mounted on the first driven shaft drivable by said second gears mounted on said carrier, a sleeve coaxial with said driven shafts, a plurality of clutch jaws on said sleeve, one set of which is connected to said final drive mechanism at all times, a jaw connected to said carrier engageable by one jaw on said sleeve to drive said final drive mechanism at an emergency low forward speed, a jaw on said first driven shaft engageable also by the said one of said sleeve jaws for driving said final drive mechanism for all other forward speeds, a jaw connected to said ring gear and engageable with still another jaw on said sleeve for reverse driving of said final drive mechanism.

2. A variable speed transmission comprising a first hollow shaft and a second shaft of substantially greater length rotatable within the first shaft and having clutch means beyond the end of the first shaft, means at one end of the transmission for selectively driving either of said shafts, planet gears, means drivably connecting the planet gears to the first shaft at an end thereof, gears connected to the planet gears to move therewith, a gear secured to the second shaft beyond the end of the first shaft and driven by at least one of said gears, a carrier drivably connected to the planet gears to be rotated thereby and having a hub with clutch means rotatably mounted on the second shaft, a ring gear driven by the planet gears having a hub with clutch means rotatably mounted on the second shaft, means for preventing rotation of the ring gear, means for preventing rotation of the carrier, an axially movable clutch member mounted on the second shaft and selectively engageable with either of the clutch means, and means for operatively connecting the clutch member to mechanism to be driven through the transmission.

3. A variable speed transmission comprising a first tubular drive shaft, a second drive shaft rotatably extending through the first shaft, first clutch means at the power-input end of the transmission selectively operative with the end portions of the shafts to connect either to a power source, a planetary gear unit drivably mounted upon the first shaft at the end remote from said clutch means, said unit including a rotary ring gear member and planet gears, said planet gears having a driving connection with the second shaft, said unit including a rotary carrier member drivably connected to said planet gears to rotate due to revolution of the planet gears about the first shaft, means for holding the ring gear member against rotation, means for holding the carrier member against rotation, the second shaft and at least one of the two members having axially fixed clutch means beyond the end of the first shaft, and axially movable clutch means at the power output end of the transmission selectively engageable with the respective axially fixed means, said movable clutch means providing a power take off for connection to a mechanism to be driven through the transmission.

4. The invention as claimed in claim 3 wherein the movable clutch means comprises a common clutch member.

5. The invention as claimed in claim 3 wherein the respective axially fixed clutch means are axially spaced and the movable clutch means comprises an axially movable common rotary clutch member slidably disposed on the second shaft.

6. In a variable speed transmission the combination of a planetary gear unit including a sun gear and planet gears, a first drive shaft for rotating the sun gear and thus the planet gears, a rotary carrier, said planet gears being rotatably mounted on the carrier whereby planetary movement of the gears causes rotation of the carrier about the axis of the first shaft, first means for holding the carrier against rotation thus causing the planet gears to rotate about their own axes, an internal rotary ring gear engaging and surrounding the planet gears and rotated thereby about the axis of the first shaft, second means for holding the ring gear against rotation thus causing the gears and the carrier to have planetary motion about the axis of the first shaft, coaxial gears affixed to the planet gears to have identical rotary and planetary movement therewith, a shaft gear engaged and driven by the coaxial gears, and a second shaft secured to and driven by the shaft gear, said first shaft being hollow and said second shaft rotatably extending therethrough to beyond the planetary gear unit, means on said second shaft beyond said unit whereby said shaft may receive torque independently of the first shaft.

7. In a variable speed transmission, a rotary shaft, a first rotary member disposed on the shaft and having a hub portion with a radial clutch ear thereon, a second rotary member disposed on the shaft and having a hub portion with an internal clutch recess therein spaced axially from the clutch ear, said shaft having a radial clutch ear on the other side of the first ear from the clutch recess, a rotary sleeve on the shaft beyond the shaft clutch ear, an axially movable rotary clutch sleeve rotatively connected to the rotary sleeve, said clutch sleeve having an internal clutch surface engageable with said clutch ears and an external clutch surface engageable with the internal clutch recess whereby rotation is transmitted from the shaft and members to the sleeves, and means for imparting predetermined rotation to each of the members and to the shaft.

8. In a variable speed transmission, the combination of a hollow shaft, a planetary gear unit including a sun gear, planet gears, and a ring gear, said unit being drivably mounted upon the inner end of the hollow shaft, a second shaft extending through the hollow shaft, gear means on the second shaft adjacent the inner end of the hollow shaft, first means operatively connecting the planet gears to the gear means whereby rotation of the planet gears rotates the gear means, a brake member rotatably secured to the planet gears for rotation about the axis of the hollow shaft, second means for fixing the brake member and therefore the planet gears against rotation about the axis of the hollow shaft, braking means for fixing the ring gear against rotation, a power takeoff member rotatably mounted on the second shaft and having radial force transmitting surfaces, third means including radial force transmitting surfaces whereby the second shaft may be operatively connected to the power takeoff member, fourth means including radial force transmitting surfaces whereby rotation of the planet gears may be transmitted to the power takeoff member, fifth means including radial force transmitting surfaces whereby the ring gear may be operatively connected to the power takeoff member said radial force transmitting surfaces being axially spaced, sixth means for selectively providing a drive connection between each of the third, fourth, and fifth means and the power takeoff member comprising an axially movable member having radial force transmitting surfaces in engagement with the surfaces on the power takeoff member and having additional radial force transmitting surfaces selectively engageable with the surfaces of the third, fourth, and fifth means, and means for independently driving either of the shafts.

9. The invention as claimed in claim 8 wherein the first means comprises gears coaxially secured to the planet gears for planetary movements therewith.

10. In a variable speed transmission, the combination of a hollow shaft, a planetary gear unit including a sun gear, planet gears, and a ring gear, said unit being driven by the hollow shaft and mounted upon the end thereof adjacent the output side of the transmission, a second shaft rotatably extending through the hollow shaft, gear means affixed to the second shaft adjacent the end of the hollow shaft, gears coaxially secured to the planet gears for planetation therewith and disposed on the output side of the planet gears, said gears having a driving engagement with the gear means, a rotary braking member on the input side of the planet gears operatively secured to the gears for rotation about the axis of the hollow shaft, means for fixing the braking member against rotation, means for selectively preventing rotation of the ring gear, a first hub rotatably disposed on the second shaft adjacent the gear means and on the output side thereof, means drivably connecting the hub to the planet gears for rotation about the axis of the second shaft, a second hub rotatably disposed on the first hub and having an internal annular clutch recess, means drivably connecting the second hub to the ring gear for rotation about the axis of the second shaft, a first radial clutch ear on the first hub on the output side of the clutch recess, a second radial clutch ear drivably secured to the second shaft on the output side of the first ear, a power takeoff sleeve rotatably mounted on the second shaft on the output side of the ears, and a clutch sleeve rotatively secured to the takeoff sleeve but slidable thereon and on the second shaft, said clutch sleeve having means for driven engagement with the clutch recess and means for driven engagement with the first and second radial clutch ears, and means for axially shifting the clutch sleeve to selectively operatively connect the first and second hubs and the second radial ear to the takeoff sleeve.

11. A variable speed transmission comprising a first drive shaft, a second drive shaft, means for selectively driving either of the shafts, a planetary gear unit driven by the first shaft including a rotary ring gear member, a gear secured on the second shaft and driven by the unit, said unit including planet gears and a carrier member connected to the planet gears to revolve therewith, means for holding the ring gear against rotation, means for holding the carrier member against rotation, the second shaft and the two members having axially fixed clutch means, and movable clutch means selectively operatively engageable with the respective fixed clutch means, said clutch means providing a power take-off for connection to a mechanism to be driven through the transmission, said fixed clutch means being axially spaced from each other and said movable clutch means comprising an axially movable common clutch sleeve surrounding an end portion of the second shaft.

12. In a variable speed transmission, the combination of a first drive shaft, a second drive shaft, means for selectively driving either of said shafts, a pair of sun gears one secured on each of said shafts, a planet gear having one portion in driven engagement with the sun gear on the first drive shaft and another portion in driving engagement with the sun gear on the second drive shaft, a rotary ring gear in driven engagement with the planet gear, a rotary carrier drivably connected to the planet gear, means for selectively preventing rotation of the ring gear, means for selectively preventing rotation of the carrier, and power take-off means operatively connectible to the second shaft, the ring gear, and the carrier.

KARL K. PROBST.

REFERENCES CITED

The following references are of record in the file of this patent:

UNITED STATES PATENTS

| Number | Name | Date |
|---|---|---|
| 686,786 | Upton | Nov. 19, 1901 |
| 817,908 | Folberth | Apr. 17, 1906 |
| 1,901,193 | Salerni | Mar. 14, 1933 |
| 1,978,416 | Dodge | Oct. 30, 1934 |
| 2,045,613 | Padgett | June 30, 1936 |
| 2,078,466 | Stauffer | Apr. 27, 1937 |
| 2,102,634 | Lysholm | Dec. 21, 1937 |
| 2,277,214 | Dodge | Mar. 24, 1942 |
| 2,372,817 | Dodge | Apr. 3, 1945 |
| 2,398,208 | Chilton | Apr. 9, 1946 |
| 2,406,225 | Kelbel | Aug. 20, 1946 |

FOREIGN PATENTS

| Number | Country | Date |
|---|---|---|
| 5,835 | Great Britain | Mar. 11, 1907 |
| 48,019 | France | June 29, 1937 |
| 146,668 | Great Britain | May 1, 1919 |
| 809,102 | France | Dec. 3, 1938 |